(12) United States Patent
Reeves et al.

(10) Patent No.: US 8,699,996 B1
(45) Date of Patent: Apr. 15, 2014

(54) MANAGING A MOBILE DEVICE'S COMMUNICATIONS

(75) Inventors: Raymond Emilio Reeves, Olathe, KS (US); Ryan Alan Wick, Apollo Beach, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 650 days.

(21) Appl. No.: 12/632,468

(22) Filed: Dec. 7, 2009

(51) Int. Cl.
*H04M 1/66* (2006.01)

(52) U.S. Cl.
USPC ........ 455/410; 455/418; 455/441; 455/456.4; 455/556.1; 455/565; 455/345

(58) Field of Classification Search
USPC .......................... 455/410–411, 418–419, 441, 455/456.1–457, 550.1, 556.1, 560, 565, 345
See application file for complete search history.

(56) References Cited

U.S. PATENT DOCUMENTS

| | | | |
|---|---|---|---|
| 6,795,017 B1 * | 9/2004 | Puranik et al. | 342/357.77 |
| 8,069,479 B2 * | 11/2011 | O'Neill | 726/21 |
| 2008/0064446 A1 * | 3/2008 | Camp et al. | 455/565 |

* cited by examiner

*Primary Examiner* — Marcos Torres (57) ABSTRACT

A system and method for managing communication rules on a mobile device are provided. In one embodiment, the communication rules are enforced by the mobile device without assistance from outside components. The communication rules a mobile device needs to enforce may be controlled by a component that is apart from the mobile device. The communication rules may take into account the application that requested the communication and the mobile device's present physical surroundings.

10 Claims, 4 Drawing Sheets

MANAGING A MOBILE DEVICE'S COMMUNICATIONS

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the Detailed-Description section. This Summary is not intended to identify key features or essential features of the claimed subject matter, nor is it intended to be used as an aid in isolation to determine the scope of the claimed subject matter.

In a first illustrative embodiment, a method for enforcing a communication rule at a mobile device is provided. The method includes receiving, at the mobile device, the communication rule, wherein the communication rule forbids communications matching criteria in the communication rule. The method also includes storing the communication rule in a communication-rule data store located on the mobile device. The method further includes receiving a request for the mobile device to initiate a communication over a wireless interface on the mobile device. The method further includes determining, at the mobile device, that the communication violates the communication rule by comparing the communication to the criteria. The method further includes preventing the communication from occurring.

In another illustrative embodiment, one or more computer-readable media having computer-executable instructions embodied thereon that when executed by a computing device perform a method of managing enforcement rules on a plurality of mobile devices are provided. The method includes receiving a request to propagate a communication rule to each of the plurality of mobile devices. The communication rule is enforced by an individual mobile device that receives the communication rule. The enforcement of the communication rule prevents wireless communications from occurring based on an individual mobile device's context. The method includes communicating the communication rule to each of a plurality of mobile devices over a wireless interface.

In a third illustrative embodiment, one or more computer-readable media having computer-executable instructions embodied thereon that when executed by a computing device perform a method of enforcing communication rules on a mobile device are provide. The method comprises receiving a communication rule that instructs the mobile device to prevent a communication from occurring based on characteristics of a present context of the mobile device. The method also includes storing the communication rule in a communication-rule data store located on the mobile device. The method further includes receiving a request to initiate a communication, wherein the communication is to occur over a radio in the mobile device. The method further comprises determining the characteristics of the present context of the mobile device. The method also includes determining, at the mobile device, that the communication violates the communication rule by comparing the characteristics of the present context to the criteria. The method also includes preventing the communication from occurring.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Embodiments of the present invention provide a system and method for managing communications on a mobile device. The communications are managed by comparing requested communications with communication rules that define the types of communications the mobile device is authorized to initiate. The communication rules are enforced locally by the mobile device. Enforcement of the communication rules by the mobile device allows the rules to take into account the context of the requested communication. The context may include the mobile device's exterior environment and application environment. For example, a requested communication may be acceptable if requested by a first application on the mobile device but prohibited if requested by a second application on a mobile device. Similarly, a communication may be acceptable when requested within a first geographic area but prohibited when requested from a second geographic area.

In one embodiment, the rules are enforced locally, but managed remotely. The list of communication rules on the mobile device may be managed by a remote server that adds, deletes, and modifies the communication rules on the mobile device. The remote management of communication rules allows an entity that has a fleet of mobile devices to impose uniform communication rules across its fleet of mobile devices or a subset of its fleet of mobile devices. For example, a company may wish to prevent all of its employees from using company provided mobile devices from accessing offensive websites and only a subset of its employees from accessing social networking sites.

Throughout the description of embodiments of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of embodiments of the present invention.

| | |
|---|---|
| API | Application Interface |
| CDMA | Code Division Multiple Access |
| CD-ROM | Compact Disk Read Only Memory |
| DVD | Digital Versatile Discs |
| EEPROM | Electrically Erasable Programmable Read Only Memory |
| GSM | Global System for Mobiles |
| LAN | Local Access Network |
| PDA | Personal Digital Assistant |

-continued

| PDSN | Packet Data Serving Node/Home Agent |
| --- | --- |
| RAM | Random Access Memory |
| ROM | Read Only Memory |
| SMS | Short Messaging Service |
| SMSC | Short Messaging Service Center |
| SIP | Session Initiation Protocol |
| TDMA | Time Division Multiple Access |

Embodiments of the present invention may be embodied as, among other things: a method, system, or computer-readable media with computer-executable instructions embodied thereon. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Figure 1:
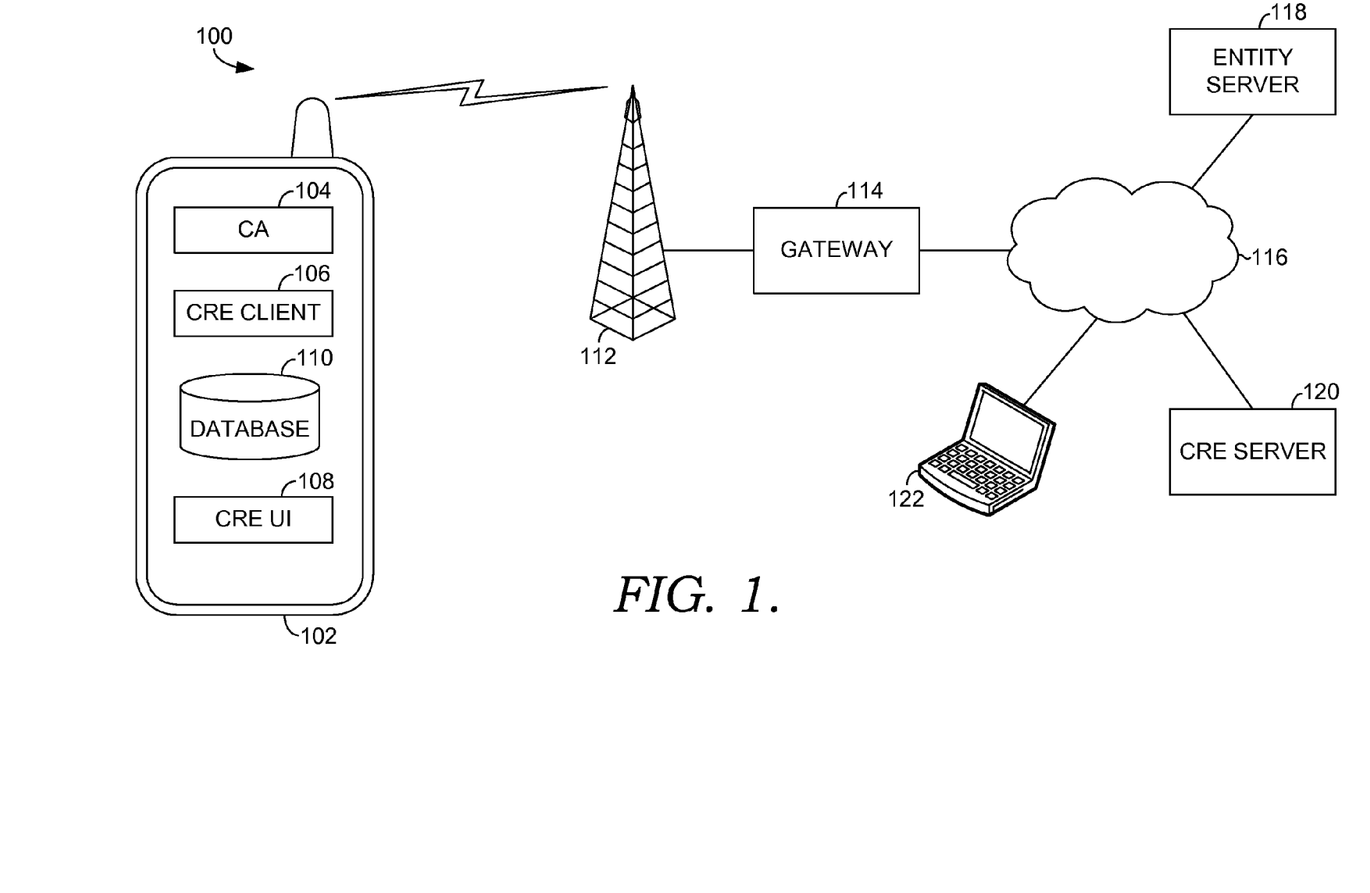
FIG. 1 is a diagram showing an illustrative operating environment suitable for practicing embodiments of the present invention.

Embodiments of the present invention may be practiced in a communications network providing service to devices communicatively coupled to the communications network. An illustrative operating environment 100 that contains a few of the components within such a communications network is shown in FIG. 1. Illustrative operating environment 100 includes mobile device 102, a communications agent 104, a communication-rule enforcement ("CRE") client 106, a CRE user-interface component 108, a data store 110, a base station 112, a gateway 114, a network 116, an entity server 118, a CRE server 120, and the computing device 122. The components shown in FIG. 1 are a few of the components that embodiments of the invention may interact with during operation. The components shown in FIG. 1 are described in brief and with an emphasis on function for the sake of simplicity. The components within FIG. 1 are communicatively coupled to each other in a manner appropriate for carrying out their respective function within the illustrative operating environment 100. Embodiments of the present invention are not limited by the communication protocols or formats used to facilitate communications between components; those mentioned are for the sake of enablement and are not meant to be limiting.

Mobile device 102 is depicted as a wireless communications device communicating over an air interface with base station 112. Mobile device 102 is a wireless terminal that is adapted to receive communications and media over the wireless networks included in illustrative operating environment 100. Some lower-level details of mobile device 102 are not shown so as to not obscure embodiments of the present invention. For example, mobile device 102 may include a bus that directly or indirectly couples the following devices: memory; one or more processors; one or more presentation components such as a display or speaker; input/output (I/O) ports; I/O components; and a power supply such as a battery. Mobile device 102 may communicate via wireless protocols, such as code division multiple access ("CDMA"), global system for mobiles ("GSM"), or time division multiple access ("TDMA"), as well as others, to communicate with base station 112.

Mobile device 102 may take on any of a variety of forms. By way of example, mobile device 102 may be a mobile telephone, smart phone, laptop computing device, desktop computing device, server, personal digital assistant ("PDA") or any combination of these or other devices. Mobile device 102 is capable of accessing content over the Internet. Examples of content that may be received include text messages, multimedia messages, emails, calendar updates, web pages, videos, pictures, and task reminders. Further, mobile device 102 may include a camera that is capable of capturing video. The mobile device 102 may be associated with a user. The user is the person submitting instructions and interacting with the mobile device 102. The illustrative operating environment 100 may have any number of mobile devices. Only one mobile device is shown for the sake of simplicity.

The mobile device 102 includes several components that enable local enforcement of communication rules. These components include the communications agent 104, the CRE client 106, the CRE user-interface component 108, and the data store 110. The communications agent 104 is a conglomeration of components that enable wireless communication through the mobile device. Though depicted as a single component, the communications agent 104 may be multiple components. The types of wireless communications enabled by the communications agent 104 include phone calls, pages, text messages, emails, and instant messages. Embodiments of the present invention are not limited to a particular form of communication or use of a particular communication protocol. Prior to initiating a wireless communication, the communications agent 104 may request clearance from the CRE client 106.

The CRE client 106 determines whether a requested communication violates one or more communication rules present on the mobile device 102. The CRE client 106 also communicates with the CRE server 120 to receive communication-rule updates. The communication-rule updates include adding a communication rule, removing a communication rule, or modifying an existing communication rule. In one embodiment, the communication rules are stored in the data store 110. The CRE client 106 may also communicate with other entities, including the entity server 118 or the CRE server 120, to report attempted communication-rule violations.

As stated, the CRE client 106 is responsible for determining when a communication rule is violated. In one embodiment, each requested communication is either approved or disapproved by the CRE client 106 prior to the communication occurring. For example, the communications agent 104 may request clearance from the CRE client 106 prior to initiating a communication. Upon receiving a request to authorize a communication, the CRE client 106 may evaluate each communication rule stored locally on the mobile device 102 to determine whether the requested communication should be authorized. Depending on the rule, the CRE client 106 may call one or more other applications on the mobile device 102 to determine the context for the requested communication.

The context of a communication may be the application requesting the communication or environmental characteristics defining the mobile device's 102 present situation. Environmental characteristics describing the mobile device's current situation include the mobile device's present geographic location, location within a designated vehicle, time of day, date, and movement characteristics. Movement characteristics include the mobile device's current velocity, acceleration, altitude, and other similar attributes.

The mobile device's environmental characteristics may be used to prohibit otherwise allowable communications when the mobile device is determined to be in a moving vehicle. In one embodiment, specific vehicles are identified through communications occurring between the vehicle and the mobile device. For example, the mobile device may pick up an RFID signal identifying a particular vehicle. Bluetooth technology or other communications may also be used to identify a particular vehicle. In some instances, a communication rule may prohibit the use of the mobile device altogether in a particular vehicle. In other instances, certain communications may be prohibited in a vehicle. For example, texting may be prohibited while phone calls may be allowed. Apart from identifying a particular vehicle, certain communication rules may prohibit authorization of communications when the mobile device's environmental characteristics indicate the mobile device is in a moving vehicle. For example, if the mobile device's velocity is above five miles per hour then a communication rule may prohibit communications from occurring, based on the assumption that the mobile device is in a moving vehicle.

As stated previously, the CRE client 106 may call other applications to help determine the mobile device's context. For example, the CRE client 106 may call a GPS application to determine the phone's present geographic location. Movement applications that are tied to accelerometers in the mobile device may be used to determine the mobile device's present velocity or other movement characteristics. In addition, specialty applications may be loaded on the mobile device along with a particular communication rule to help determine the context applicable to the communication rule. For example, applications enabling communication with a vehicle may used by the mobile device to determine when a mobile device is in a vehicle.

The CRE client 106 may enforce rules based on context related to the application requesting the communication. For example, a communication rule may allow a personal information management application to initiate a wireless communication, while simultaneously prohibiting a browser application from initiating a wireless communication session. Communication rules may be both application specific and environment specific. For example, a mapping application may be allowed to initiate a wireless communication session when a mobile device is within a moving vehicle but an instant messaging application may be prohibited from initiating a wireless communication session while the device is within a moving vehicle.

The CRE client 106 may also communicate with the CRE server 120 to receive communication-rule updates. As described previously, the communication-rule updates include adding, deleting, and modifying communication rules. In addition, the CRE client 106 may report attempted rule violations to one or more entities. For example, the CRE client 106 may report a communication request that violates a communication rule to the entity server 118 without communicating the attempted rule violation to another server, such as the CRE server 120. In another embodiment, the attempted communication-rule violation may be sent to computing device 122, as part of a parental control function. The reception of new communication rules may be invisible to users of the mobile device 102. Similarly, the user of the mobile device 102 may not be able to access the CRE client 106 or the listed communication rules in data store 110.

The CRE user-interface component 108 provides an interface on the display of the mobile device 102 to communicate information to the user of the mobile device. For example, the CRE user-interface component 108 may generate a notification indicating that a requested communication violates a communication rule. In one embodiment, the CRE user-interface component 108 may provide an interface that allows the user to override a potential communication-rule violation by typing in a code or password. In one embodiment, the CRE user-interface component 108 allows the user to view an explanation of communication rules present on the mobile device. In one embodiment, the CRE user-interface component 108 may allow the user to add, delete, or modify communication rules. But, as described above, in another embodiment the user of the mobile device does not have access to the communication rules and the functions of the CRE user-interface component 108 may be more limited.

Base station 112 is a fixed station used for communicating with mobile device 102. Standard air interface protocols, such as code division multiple access ("CDMA"), global system for mobiles ("GSM"), or time division multiple access ("TDMA"), as well as others, may be used by base station 112 to communicate with mobile devices. Other network communications interface arrangements are also possible. A base station controller (not shown) is responsible for handling traffic and signaling with mobile device 102. Only one base station 112 is shown, and without its many components, for the sake of clarity. Mobile device 102 could be in simultaneous communication with multiple base stations. The base station 112 and related components may be described as a radio-access network. A radio-access network may be one part of a larger wireless telecommunications network.

Gateway 114 provides a boundary between radio communication functions embodied in one or more radio-access systems that form the access-facing portion of illustrative operating environment 100 and the standard internet protocol ("IP") communication functions (including Mobile IP) embodied in the public-network facing portion (e.g., network 116) of illustrative operating environment 100. Access gateway 114 might be, for example, an ASN-GW, a PDSN, an SGSN/GGSN, and the like. The gateway 114 includes a computing device that may include a CPU, short-term memory, long-term memory, and one or more network interfaces. The network interfaces are used to communicate data between the network 116 and devices, such as mobile device 102, connected to the access-facing portion of illustrative operating environment 100. A network interface to the WAN or LAN could be wired, wireless, or both.

Network 116 may include one or more mobile networks, one or more packet-based networks, including the Internet, and the public-switched telephone network ("PSTN"). The various components within network 116 may be owned and/or operated by multiple entities, commercial or otherwise. Network 116 is configured to transmit a variety of communication formats including phone calls, emails, text messaging, faxes, instant messaging, pages, voice mails, photographs, audio files, web pages, videos, movies, TV shows, calendar reminders, task reminders, and other files containing communicative content.

The entity server 118 manages communication rules on behalf of an entity with a fleet of mobile devices, such as mobile device 102. The entity server 118 includes a computing device that may include a CPU, short-term memory, long-term memory, and one or more network interfaces. The network interface is used to connect to a LAN, WAN (including the Internet), or other variety of communications network. The network interface to the WAN or LAN could be wired, wireless, or both. The entity server 118 may be used by an entity to interface with the CRE server 120 and with individual mobile devices to receive attempted rule violations. The entity server 118 may be operated by an entity that has a fleet of mobile devices. For example, the entity's fleet of mobile devices may be given to employees for their use. The entity server 118 may instruct the CRE server 120 to add, delete, or modify communication rules on one or more mobile devices within the entity's fleet. When an attempted communication violates a communication rule, the mobile device 102 may send the entity server 118 a message reporting the attempted communication-rule violation.

The CRE server 120 is responsible for updating and tracking the communication rules presently stored on individual mobile devices. In one embodiment, the CRE server 120 does not actually enforce any of the communication rules. Rather, the mobile devices themselves enforce the communication rules. The CRE server 120 may push a communication rule to an entire fleet of mobile devices associated with an entity, upon receiving a request from the entity. The CRE server 120 may manage the communication rules on mobile devices associated with multiple entities and individuals. This allows the entity to manage communications occurring across its fleet of mobile devices. The CRE server 120 may maintain a database (not shown) that contains a record of the communication rules on each individual mobile device associated with the CRE server 120. The CRE server 120 may also push applications associated with communication rules to an individual mobile device. The applications may be necessary to determine a context of the mobile device at the time a communication is requested.

The computing device 122 allows a user to access content on other computing devices over network 116. The computing device 122 may include a bus that directly or indirectly couples the following devices: memory; one or more processors; one or more presentation components such as a display or speaker; input/output (I/O) ports; I/O components; and a power supply such as a battery. The computing device 122 includes a network interface that allows the computing device 122 to receive and send communications over network 116. The computing device 122 includes, or is coupled to, a display device capable of displaying content to a user. The computing device 122 may take the form of a desktop computer, laptop computer, PDA, smart phone, and/or other similar device.

The computing device 122 may be used to interact with the CRE server 120 to provide instructions to push or update communication rules on the mobile device 102. The computing device 122 may be used by an individual user to update communication rules on their own mobile device. In another embodiment, the computing device 122 is used by parents to exercise parental control over their children's mobile devices. Notification of attempted communication-rule violations may be sent to an email address, mobile address, or other destination so that the parent may receive the notification. Communication rules may be established by users over their own mobile devices apart from an entity or parental controls.

Figure 2:
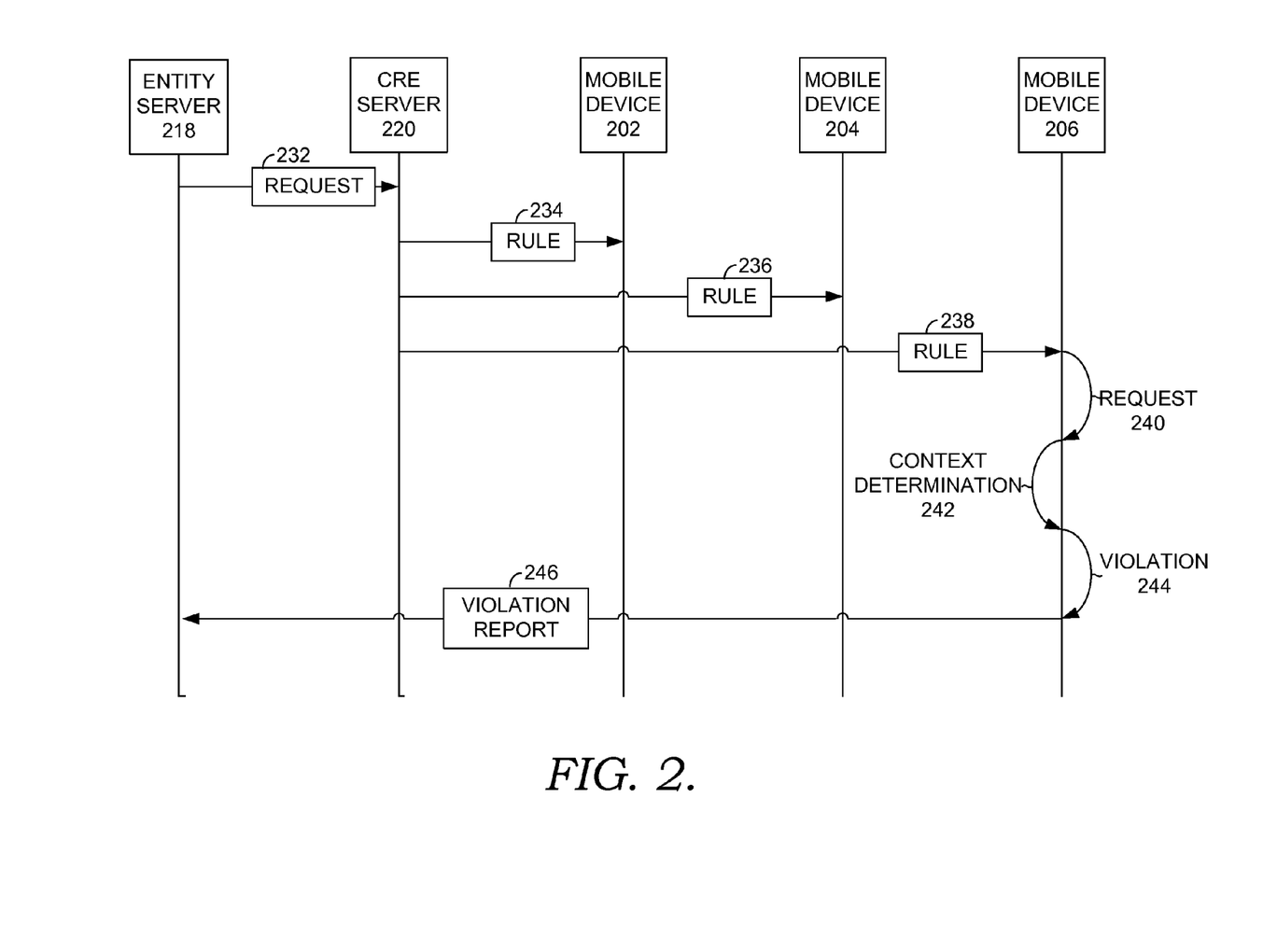
FIG. 2 is a diagram showing communications occurring between components during management of a communication rule, in accordance with an embodiment of the present invention.

Turning now to FIG. 2, communications occurring between components during management of a communication rule are shown, in accordance with an embodiment of the present invention. The communications occur between an entity server 218, a CRE server 220, a mobile device 202, a mobile device 204, and a mobile device 206. Mobile devices 202, 204, and 206 may be similar to the mobile device 102 described previously with reference to FIG. 1. Similarly, the entity server 218 may be similar to entity server 118 described previously and the CRE server 220 may be similar to the CRE server 120 described previously with reference to FIG. 1. In FIG. 2, the entity associated with the entity server 218 has deployed a fleet of mobile devices including mobile devices 202, 204, and 206.

Initially, the entity server 218 sends a request 232 to push a new communication rule to the mobile devices 202, 204, and 206. For the sake of simplicity, only three mobile devices are shown in this illustration. In an actual embodiment, hundreds or thousands of mobile devices may be in an entity's fleet of mobile devices. In response to receiving the request 232, the CRE server 220 pushes an individual communication rule to each mobile device in the entity's fleet. In this case, the rule 234 is sent to mobile device 202, the rule 236 is sent to the mobile device 204, and the rule 238 is sent to the mobile device 206. Upon receiving the communication rules, the mobile devices 202, 204, and 206 store the communication rule in a data store associated with the mobile device.

In one embodiment, rules 234, 236, and 238 are each identical. In another embodiment, rules 234, 236, and 238 are each individualized based on the characteristics and capabilities of the mobile device to which the rule is sent. The CRE server 220 may automatically generate individualized rules for individual mobile devices based on a generic communication-rule request from the entity server. The CRE server 220 may also elect not to send a communication rule to a mobile device if the mobile device does not have the capabilities to enforce a rule. For example, if GPS location is necessary to determine whether a communication-rule is violated then this communication rule may not be sent to mobile devices without GPS location functionality. In one embodiment, an entity may create subgroups of mobile devices within its fleet to which uniform communication rules are sent. The subgroups may be based on devices, employment classification, or other characteristics designated by the entity.

A communication request 240 is received by the mobile device 206. The communication request may originate from a particular application on the mobile device. The communication request may be generated by a user interacting with the mobile device or automatically by an application on the mobile device.

Upon receiving the communication request 240, the mobile device 206 determines its present context 242. A CRE client installed on the mobile device 206 may determine the context. Examples of context have been described previously. In this instance, a violation 244 of the communication rule 238 is detected. Next, a violation report 246 is sent to the entity server 218. The violation report 246 bypasses the CRE server 220 in this embodiment.

In another embodiment, the CRE server 220 may receive the violation report and track attempted violations on behalf of an entity. Though not shown in FIG. 2, the mobile device 206 may also display a notification to the user indicating that a communication rule has been violated by the requested communication 240.

Figure 3:
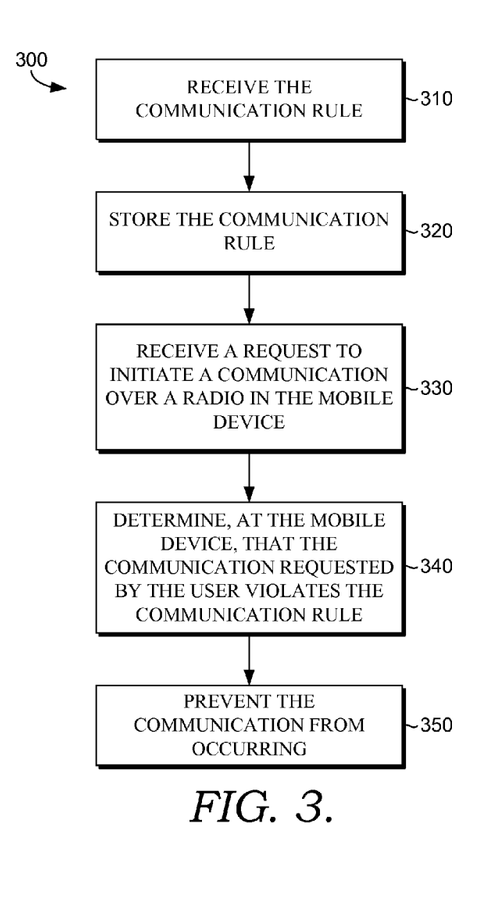
FIG. 3 is a flowchart of a method for enforcing a communication rule at a mobile device, in accordance with an embodiment of the present invention.

Turning now to FIG. 3, a method 300 for enforcing a communication rule at a mobile device is shown, in accordance with an embodiment of the present invention. The mobile device on which the method 300 is practiced may be similar to the mobile device 102 described previously with reference to FIG. 1. The method 300 may be performed by one or more components installed on the mobile device, including a CRE client, database, and CRE interface.

At step 310, the communication rule is received. A communication rule may be received from a CRE server. In one embodiment, the CRE server is managed by the telecommunications entity providing network availability to the mobile device on which method 300 is performed. As described previously, the communication rule forbids communications meeting one or more criteria. The criteria may include characteristics of the communication itself, such as a destination IP address, and a context of the communication. The context may include the mobile device's physical surroundings and the application that requested the communication.

At step 320, the communication rule is stored in a data store located on the mobile device. Storing the communication rule locally allows the mobile device to enforce the communication rule without consulting network components.

At step 330, a request for the mobile device to initiate a communication over the mobile device's wireless interface is received. Examples of communications requested include a request to initiate a wireless connection for a phone call, send a page, send a text message, and a request to log in to an email server. The request may be generated by a user interacting with an application or an application self-initiating the request. In either instance, each request may be associated with an application.

At step 340, the mobile device determines that the communication requested by the user violates the communication rule. As described previously, this determination may be made without consulting components outside of the mobile device. The mobile device may call various applications within the mobile device to ascertain one or more aspects of the mobile device's present context. The present context may be used to determine whether the communication rule is violated by the requested communication.

Upon determining the requested communication violates the communication rule, at step 350, the communication is prevented from occurring. In addition, a violation indication may be sent to one or more parties that track the attempted violations, such as an entity that provided the mobile device on which the method 300 is practiced to an employee. In another embodiment, an indication is provided through a display on the mobile device.

Figure 4:
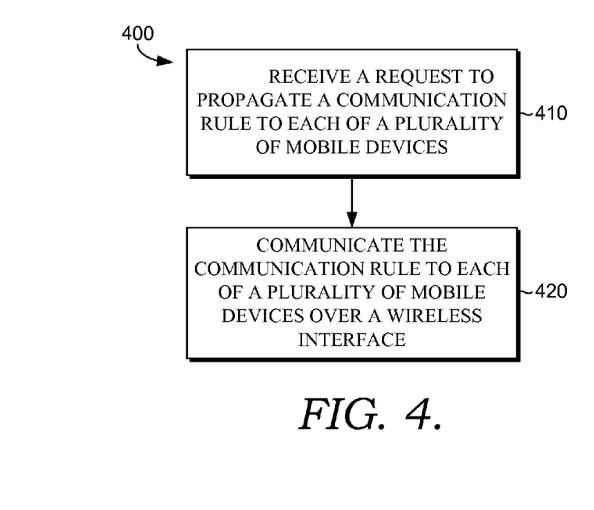
FIG. 4 is a flowchart of a method of managing enforcement rules on a plurality of mobile devices, in accordance with an embodiment of the present invention.

Turning now to FIG. 4, a method 400 of managing enforcement rules on a plurality of mobile devices is described, in accordance with an embodiment of the present invention. The plurality of mobile devices may be managed on behalf of an entity responsible for the mobile devices. As described previously, an entity may issue mobile devices to a number of its employees. Also, parents may give mobile devices to their children and wish to enforce communication rules on the mobile devices.

At step 410, a request to propagate a communication rule to each of a plurality of mobile devices is received. As described previously, the communication rule is enforced by an individual mobile device that receives the communication rule. Enforcement of the communication rule prevents wireless communications from occurring based on an individual mobile device's context. As described previously, the context may include the application that requested a communication as well as exterior characteristics of the mobile device's environment. The exterior characteristics may include a vehicle within which the mobile device is located. The vehicle may be identified by exchanging communications with the mobile device.

At step 420, the communication rule is communicated to each of a plurality of mobile devices over a wireless interface. The communication rule may be communicated to each mobile device within an entity's fleet of mobile devices or to a subset of mobile devices. As described previously, an entity may wish to enforce certain communication rules on a subset of its fleet of mobile devices. Thus, the communication rules on mobile devices within an entity's fleet may be customized to the particular type of mobile device and for the user of the mobile device. A record may be made in a database to track the communication rules on each mobile device within a fleet of mobile devices.

Figure 5:
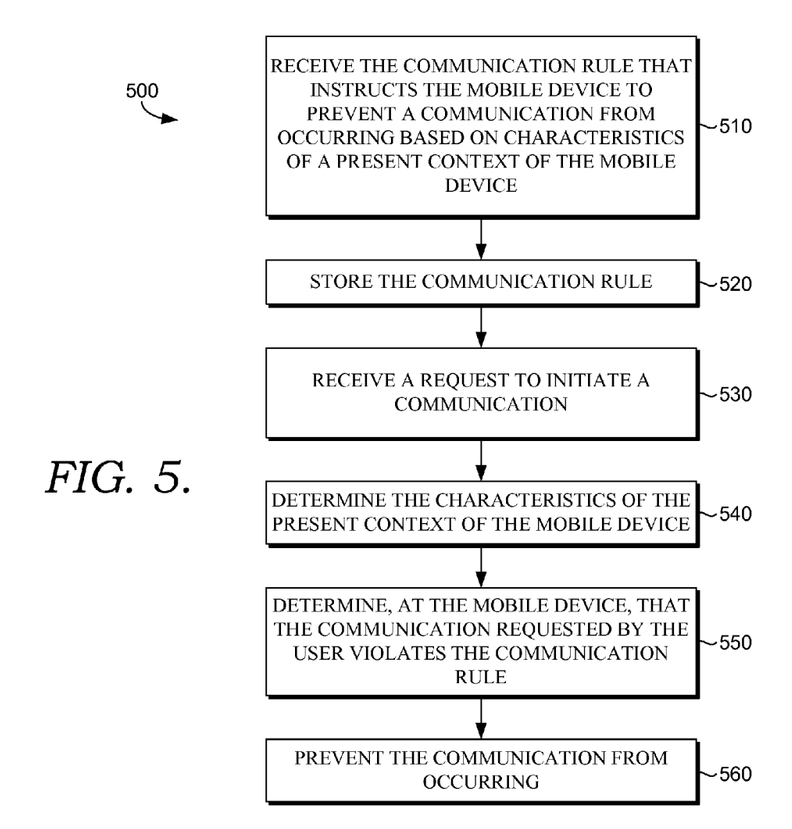
FIG. 5 is a flowchart of a method of enforcing communication rules on a mobile device is provided, in accordance with an embodiment of the present invention.

Turning now to FIG. 5, a method 500 of enforcing communication rules on a mobile device is provided, in accordance with an embodiment of the present invention. At method 510, a communication rule that instructs the mobile device to prevent a communication from occurring based on characteristics of a present context is received. The communication rule may also take into account characteristics of the communication. Characteristics of the communication include the type of communication, communication protocols, a designation address, IP address, a URL, and other characteristics of the communication. Characteristics of the communication may be separate from the characteristics of the present context of the mobile device. As described previously, the characteristics of a present context for the mobile device include the application that requested the communication and physical characteristics of the environment in which the mobile device is located.

At step 520, the communication rule is stored in a communication-rule data store located on the mobile device. The communication rules in the communication-rule data store may be retrieved when a particular communication is requested and compared with the requested communication to determine whether the requested communication violates one of the communication rules. At step 530, a request to initiate a communication over a radio in the mobile device is received. As described previously, the request may come from a particular application with or without direct input from a user. At step 540, the characteristics of the present context of the mobile device are determined. The characteristics may be determined by calling other applications on the mobile device and requesting information. For example, the GPS location may be requested from a GPS component.

At step 550, the communication requested by the user is determined to violate the communication rule. This determination is made by comparing the characteristics of the present context to the communication rule. The characteristics of the communication may also be used to determine whether the communication rule is violated. At step 560, the communication is prevented from occurring as a result of it violating the communication rule.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A method for enforcing a communication rule on behalf of a corporate entity at a mobile device given to an employee of the corporate entity, the method comprising:

receiving, at the mobile device, the communication rule, wherein the communication rule forbids communications matching a criteria in the communication rule;

storing the communication rule in a communication-rule data store located on the mobile device;

receiving at the mobile device, a request for the mobile device to initiate a communication over a wireless interface on the mobile device;

identifying that the mobile device is within a corporate entity's vehicle by receiving a communication containing the corporate entity's vehicle's identification information;

determining, at the mobile device, that the communication violates the communication rule by comparing a present context of the mobile device to a context characteristic specified in the criteria, wherein the present context of the mobile device includes being located within the corporate entity's vehicle; and preventing the communication from occurring.

2. The method of claim 1, wherein the method further comprises displaying a notification on the mobile device's display indicating the communication violates the communication rule.

3. The method of claim 1, wherein the method further comprises communicating a notification over the wireless interface indicating that the communication violates the communication rule.

4. The method of claim 1, wherein the criteria includes an application from which the request was received.

5. The method of claim 1, wherein the present context of the mobile device further includes the mobile device's present velocity within the corporate entity's vehicle.

6. One or more computer-readable media having computer-executable instructions embodied thereon that when executed by a computing device perform a method of managing enforcement rules on a plurality of employee mobile devices, the method comprising:

creating a plurality of subgroups in the plurality of employee mobile devices, wherein each subgroup in the plurality of subgroups is based on a classification designated by an employer entity with supervision over the plurality of mobile devices;

receiving a request to propagate an individualized communication rule to each employee mobile device within the plurality of subgroups based on the classification of each subgroup, wherein the individualized communication rule is enforced by each individual employee mobile device in the plurality of employee mobile devices that receives the individualized communication rule, and wherein enforcement of the individualized communication rule prevents wireless communications from occurring based on each individual employee mobile device's context in the plurality of employee mobile devices, wherein an individual employee mobile device's context comprises the individual employee mobile device being located within a moving vehicle;

in response to receiving the request, communicating the individualized communication rule to each of the plurality of employee mobile devices over a wireless interface;

storing the individualized communication rule in a data store associated with each employee mobile device; and when the individualized communication rule is violated, enforcing the individualized communication rule in each employee mobile device that violated the rule.

7. The media of claim 6, wherein the method further comprises communicating an application to each of the plurality of employee mobile devices, wherein the application allows each individual employee mobile device to determine a context for each individual employee mobile device.

8. The media of claim 7, wherein the application is not accessible to a user of each individual employee mobile device.

9. The media of claim 6, wherein the method further comprises receiving an indication from each individual employee mobile device that a user requested a communication that violated the communication rule.

10. The media of claim 6, wherein the request is generated by the employer entity with supervision over the plurality of mobile devices, and wherein an individual employee mobile device's context further comprises a present geographic location of the individual mobile device.

* * * * *